US012779564B2

(12) United States Patent
Springer et al.

(10) Patent No.: US 12,779,564 B2
(45) Date of Patent: Nov. 3, 2026

(54) BLADE FOR A POWER TOOL

(71) Applicant: MILWAUKEE ELECTRIC TOOL CORPORATION, Brookfield, WI (US)

(72) Inventors: John J. Springer, Milwaukee, WI (US); James E. Pangerc, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 502 days.

(21) Appl. No.: 17/792,626

(22) PCT Filed: Jan. 15, 2021

(86) PCT No.: PCT/US2021/013562
§ 371 (c)(1),
(2) Date: Jul. 13, 2022

(87) PCT Pub. No.: WO2021/146511
PCT Pub. Date: Jul. 22, 2021

(65) Prior Publication Data

US 2023/0044567 A1 Feb. 9, 2023

Related U.S. Application Data

(60) Provisional application No. 62/961,419, filed on Jan. 15, 2020.

(51) Int. Cl.
*B23D 61/00* (2006.01)
*B23D 51/10* (2006.01)

(52) U.S. Cl.
CPC ............ *B23D 61/006* (2013.01); *B23D 51/10* (2013.01)

(58) Field of Classification Search
CPC .............................. B23D 51/10; B23D 61/006
See application file for complete search history.

(56) References Cited

U.S. PATENT DOCUMENTS 1,843,223 A * 2/1932 Hasseler .................. A22B 3/10 452/132
2,635,337 A * 4/1953 Mercy ....................... B26B 3/08 D7/649

(Continued)

FOREIGN PATENT DOCUMENTS

CN 104249189 A * 12/2014
DE 202011108736 U1 4/2012

(Continued)

OTHER PUBLICATIONS

Chinese Patent Office Action for Application No. 202190000216.1 dated Sep. 27, 2022 (3 pages including statement of relevance).

(Continued)

*Primary Examiner* — Liang Dong
(74) *Attorney, Agent, or Firm* — Michael Best & Friedrich LLP

(57) ABSTRACT

A blade for use with an oscillating power tool. The blade includes an attachment portion including a mounting aperture arrangement configured to couple with the oscillating power tool. The blade also includes a body extending from the attachment portion in a direction defining a longitudinal axis. The body includes a distal end generally opposite the attachment portion and first and second side edges extending between the attachment portion and the distal end. The blade also includes a channel open to one of the first or second side edges and extending towards the longitudinal axis from an open end to a closed end, the channel being defined by a first elongated edge and a second elongated edge opposed to the first elongated edge. At least one of the first or second elongated edges includes a chamfer.

14 Claims, 8 Drawing Sheets

(56) References Cited

U.S. PATENT DOCUMENTS

| | | | | |
|---|---|---|---|---|
| 5,456,011 | A | 10/1995 | Inkster | |
| 5,485,677 | A | 1/1996 | Seber | |
| 7,691,106 | B2 | 4/2010 | Schenberger et al. | |
| 8,568,204 | B2 | 10/2013 | Steiger et al. | |
| 8,685,028 | B2 | 4/2014 | Kim | |
| 9,027,452 | B2 | 5/2015 | Nagy et al. | |
| 10,040,215 | B2 | 8/2018 | Rubens et al. | |
| 10,307,917 | B2 | 6/2019 | Marks | |
| 2001/0041524 | A1 | 11/2001 | Steiger et al. | |
| 2011/0046627 | A1 | 2/2011 | Kim | |
| 2013/0167382 | A1 | 7/2013 | Maras et al. | |
| 2015/0273706 | A1* | 10/2015 | Martin | B26B 9/02<br>30/353 |
| 2018/0117687 | A1 | 5/2018 | Rubens et al. | |
| 2018/0194019 | A1* | 7/2018 | Knox | E04D 15/02 |
| 2019/0240752 | A1 | 8/2019 | Churchill | |

FOREIGN PATENT DOCUMENTS

| | | | |
|---|---|---|---|
| EP | 3213847 | A1 | 9/2017 |
| JP | H0668677 | U | 9/1994 |
| JP | 2003175490 | A | 6/2003 |
| WO | 2012022269 | A1 | 2/2012 |

OTHER PUBLICATIONS

Imperial Blades, "One Fit™ Hard Material Rigid Scraper," IBOA500, <https://imperialblades.com/products/iboa500-hard-material-rigid-scraper/> web page visited Nov. 19, 2019 (2 pages).

International Search Report and Written Opinion for Application No. PCT/US2021/013562 dated May 7, 2021 (10 pages).

* cited by examiner

BLADE FOR A POWER TOOL

CROSS-REFERENCE TO RELATED APPLICATION

This application is a national stage filing under 35 U.S.C. § 371 of International Application No. PCT/US2021/013562 filed on Jan. 15, 2021, which claims priority to U.S. Provisional Patent Application No. 62/961,419 filed on Jan. 15, 2020, the entire contents of all of which are incorporated herein by reference.

BACKGROUND

The present disclosure relates to a blade for power tools, and more particularly to a blade for an oscillating power tool.

SUMMARY

In one aspect, the disclosure provides a blade for use with an oscillating power tool. The blade includes an attachment portion including a mounting aperture arrangement configured to couple with the oscillating power tool. The blade also includes a body extending from the attachment portion in a direction defining a longitudinal axis. The body includes a distal end generally opposite the attachment portion and first and second side edges extending between the attachment portion and the distal end. The blade also includes a channel open to one of the first or second side edges and extending towards the longitudinal axis from an open end to a closed end, the channel being defined by a first elongated edge and a second elongated edge opposed to the first elongated edge. At least one of the first or second elongated edges includes a chamfer.

In another aspect, the disclosure provides a blade for use with an oscillating power tool. The blade includes an attachment portion including a mounting aperture arrangement configured to couple with the oscillating power tool. The blade also includes a body extending from the attachment portion in a direction defining a longitudinal axis. The body includes a distal end generally opposite the attachment portion and first and second side edges extending between the attachment portion and the distal end. The blade also includes a channel open to one of the first or second side edges and extending towards the longitudinal axis from an open end to a closed end, the channel being defined by a first elongated edge and a second elongated edge opposed to the first elongated edge. At least one of the first or second edges is configured as a sharp cutting edge.

In another aspect, the disclosure provides a blade for use with an oscillating power tool. The blade includes an attachment portion including a mounting aperture arrangement configured to couple with the oscillating power tool. The blade also includes a body extending from the attachment portion in a direction defining a longitudinal axis. The body includes a distal end generally opposite the attachment portion and first and second side edges extending between the attachment portion and the distal end. The blade also includes a channel open to one of the first or second side edges and extending towards the longitudinal axis from an open end to a closed end, the channel being defined by a first elongated edge and a second elongated edge opposed to the first elongated edge. The channel includes a gap between the first and second elongated edges defined as a smallest distance therebetween. The gap is sized for cutting a sheet having a thickness of about 0.0625 inches or less between the first and second elongated cutting edges.

In some implementations, at least one of the first and second elongated edges is convex into the channel. In some implementations, both of the first and second elongated edges are convex into the channel. In some implementations, the first and second elongated edges are toothless. In some implementations, the distal end meets one of the first or second side edges at a pointed tip portion configured to pierce a pilot hole in a workpiece. In some implementations, a gap between the first and second elongated edges corresponds with a gauge of metal from 16 gauge to 30 gauge. In some implementations, the longitudinal axis is disposed between the two side edges in a non-intersecting fashion. In some implementations, the first and second elongated edges extend from the open end toward the closed end. In some implementations, the channel further includes a chamfered cutter proximate the closed end of the channel.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. The terms "substantially", "generally", and "about" may be used herein to encompass "exactly" and "approximately". The terms "walls" and "edges" may be defined interchangeably herein.

Figure 1:
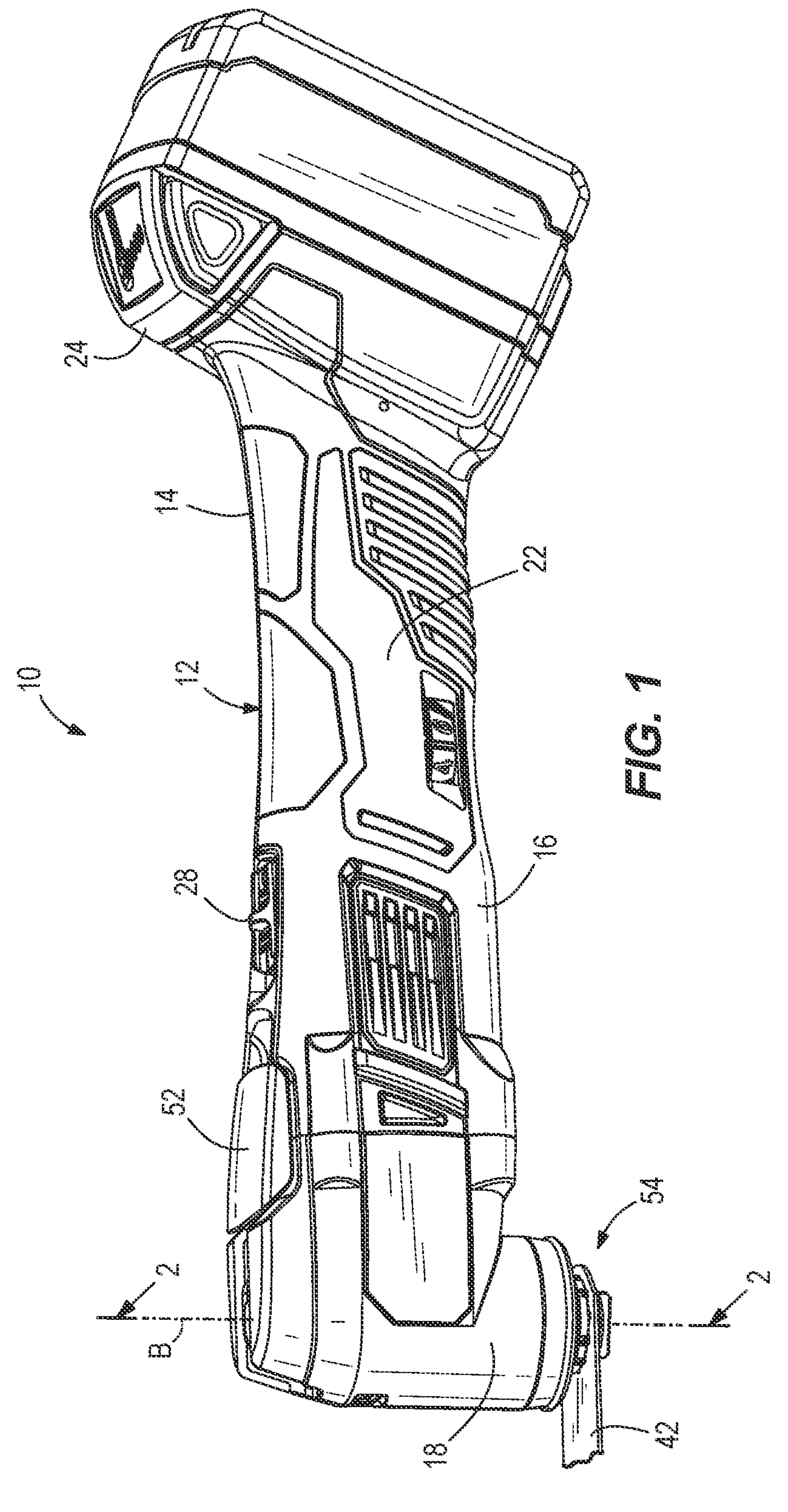
FIG. 1 is a side view of an oscillating power tool for receiving interchangeable working tools, such as blades.

FIG. 1 illustrates a power tool 10 according to one implementation of the disclosure. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIG. 2) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
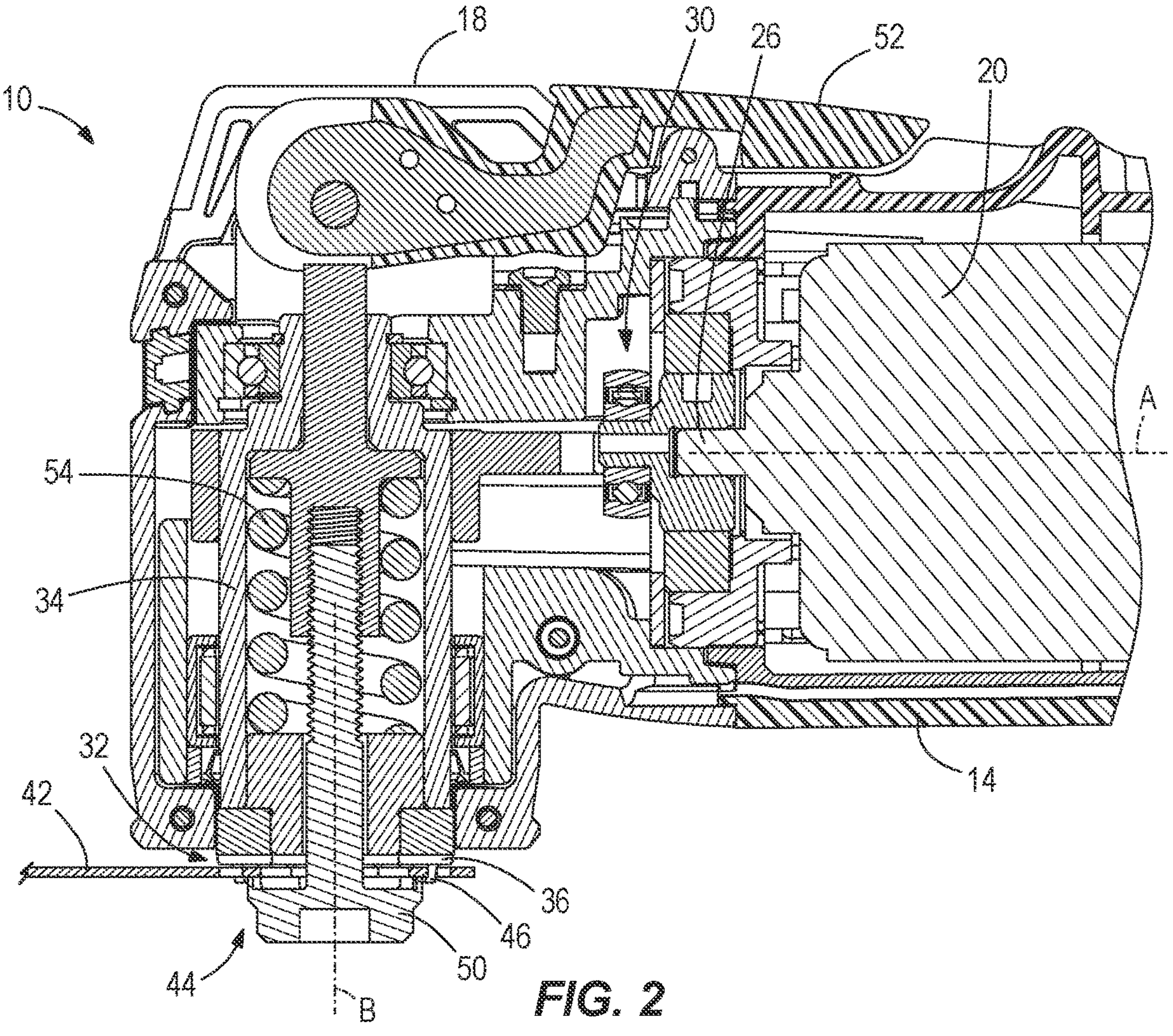
FIG. 2 is a side view cross-section of a head portion of the oscillating power tool of FIG. 1.

The housing 14 also houses a drive mechanism 30 (FIG. 2) for converting rotary motion of the motor drive shaft 26 into oscillating motion of an output mechanism 32. As shown in FIG. 2, the output mechanism 32 includes a spindle 34 having an accessory holder 36 disposed at a distal end thereof. As shown in FIG. 2, the spindle 34 terminates, at a free end, with the accessory holder 36. The accessory holder 36 is configured to receive an accessory, such as a blade 42, and a clamping mechanism 44 (FIG. 2) clamps the blade 42 to the accessory holder 36. Specifically, the accessory holder 36 includes a first locating feature 46, such as a protrusion or protrusions sized and shaped for receiving the blade 42. The clamping mechanism 44 includes a clamping flange 50 at a distal end thereof for clamping the blade 42 to the accessory holder 36 for oscillating motion with the spindle 34. A clamping actuator 52, such as a lever, is configured to apply and release a clamping force from a biasing member 54, such as a spring. The spindle 34 defines an oscillation axis B, substantially perpendicular to the motor axis A, about which the spindle 34 oscillates, as will be described in greater detail below. In other implementations, other clamping actuators may be employed, such as a button, a knob, etc.

Figure 3:
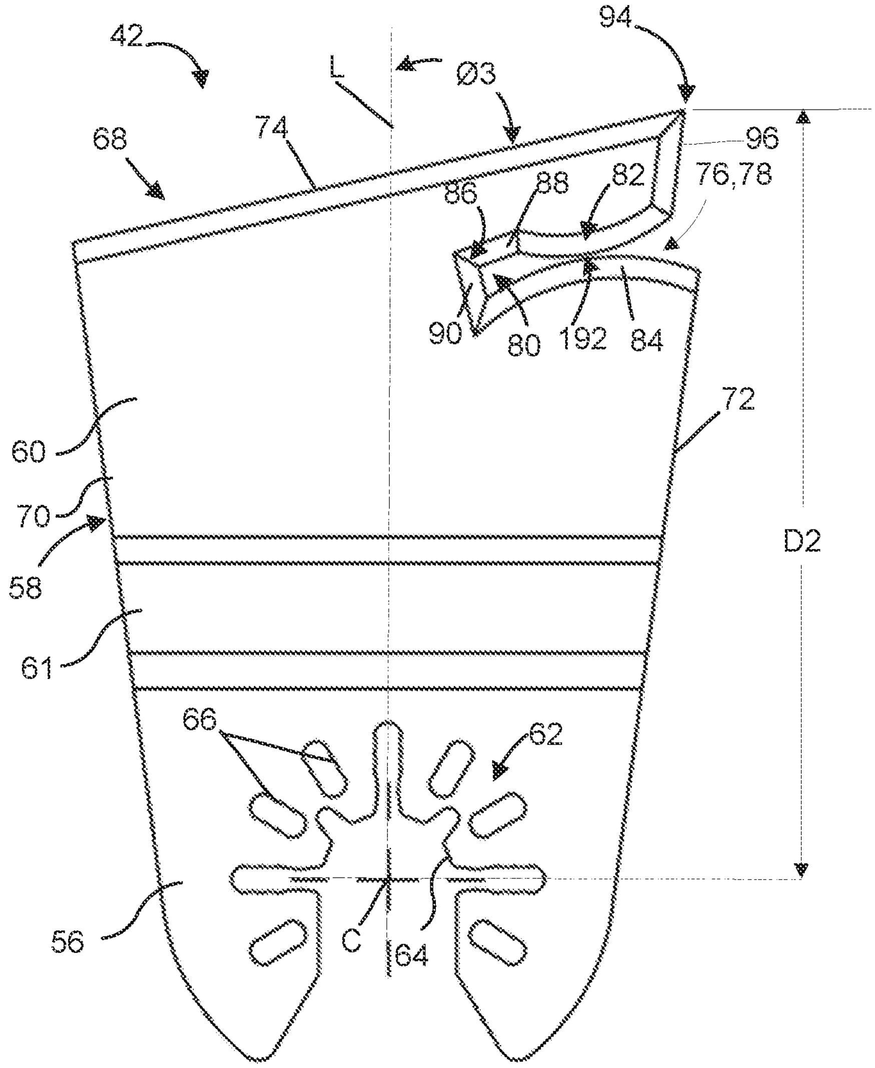
FIG. 3 is a top view of a blade attachable to the oscillating power tool of FIG. 1 according to one implementation of the disclosure.
Figure 4:
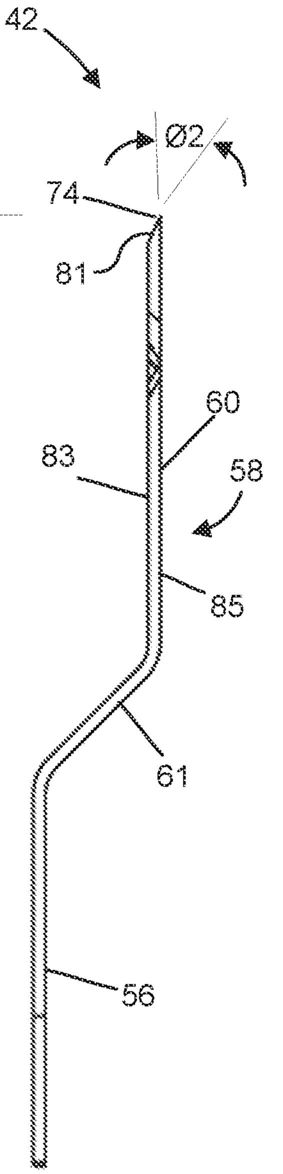
FIG. 4 is a side view of the blade shown in FIG. 3.
Figure 5:
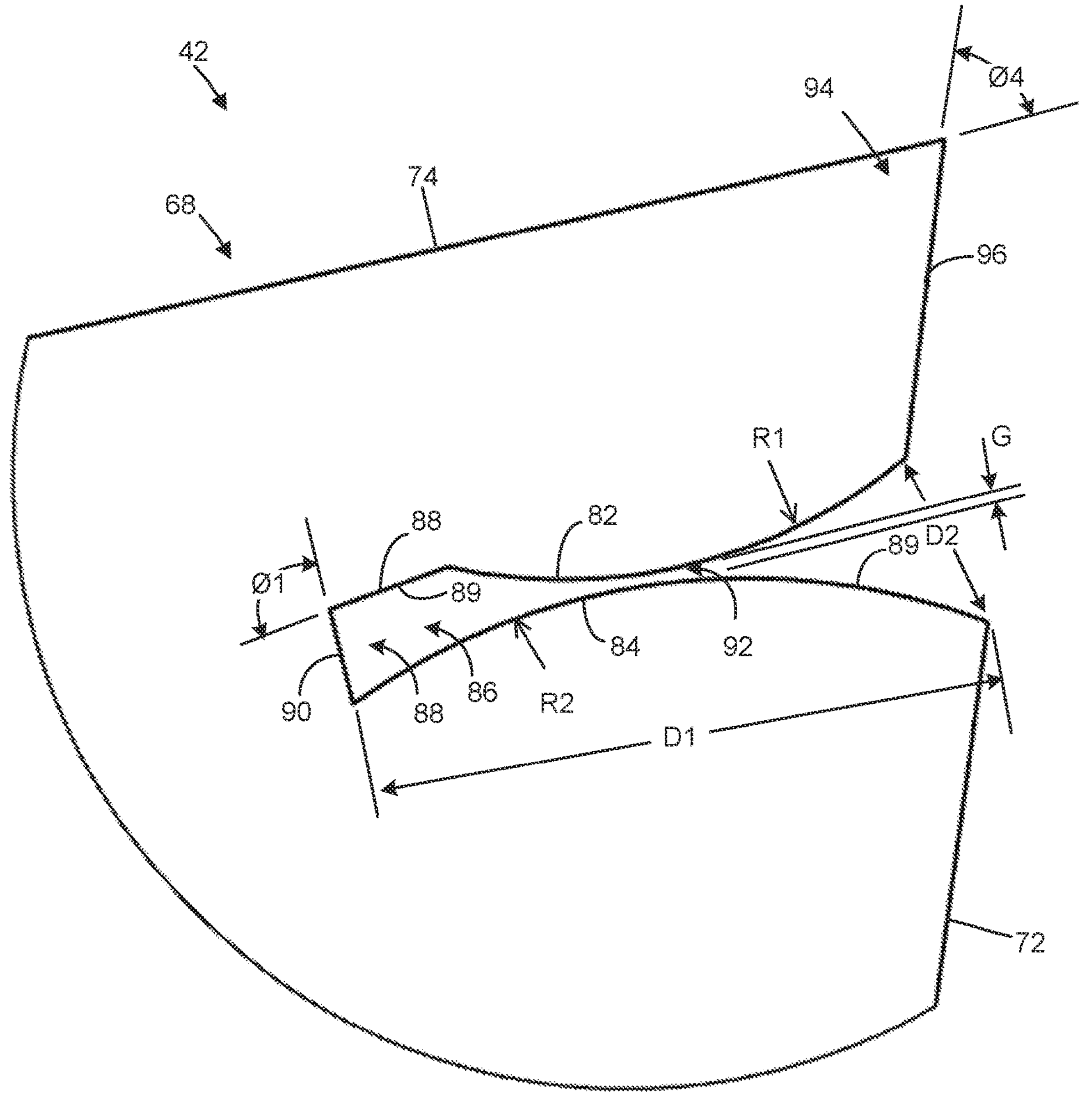
FIG. 5 is a detail view of a portion of the blade shown in FIG. 3 having the chamfers hidden to more clearly illustrate the edges.

FIGS. 3-5 illustrate the blade 42 according to one implementation of the disclosure. The blade 42 is preferably formed from metal, which may include a metal, a metal alloy, a bi-metal, or any combination of metals, metal alloys, bi-metals, etc. For example, the metal may include hardened steel, carbide, etc. The blade 42 may be formed from other materials in other implementations. The blade 42 includes an attachment portion 56 and a body 58 extending from the attachment portion 56 along a longitudinal axis L in a fixed manner with respect to the attachment portion 56. The body 58 includes a step 61 and a working portion 60 offset from the attachment portion 56 in different planes, which may be generally parallel. In other implementations, the blade 42 is generally planar (e.g., see the implementations illustrated in FIGS. 6-11) such that the attachment portion 56 and the body 58 generally extend in a single plane, though slight deviations from a plane may exist.

The attachment portion 56 includes a mounting aperture arrangement 62 including a central aperture 64 and a plurality of peripheral apertures 66 not in communication with the central aperture 64. The attachment portion 56 is configured to engage with the clamping mechanism 44 to securely and releasably connect the blade 42 to the oscillating tool 10. The central aperture 64 may be open, e.g., a slot, as shown in the illustrated implementation. In other implementations, the central aperture 64 may be a closed aperture. The central aperture 64 defines an anchor center C and is configured such that the anchor center C intersects the oscillation axis B, about which the blade 42 is configured to oscillate rotatingly, when attached to the oscillating tool 10. The blade 42 defines the longitudinal axis L disposed generally perpendicular to the oscillation axis B, the longitudinal axis L also intersecting the anchor center C and extending from the attachment portion 56 through the body 58.

The body 58 extends from the attachment portion 56 in a direction defining the longitudinal axis L. The body 58 includes a distal end region 68 generally opposite the attachment portion 56, and first and second side edges 70, 72 extending between the attachment portion 56 and the distal end region 68. The first and second side edges 70, 72 are substantially straight in the illustrated implementation and diverge from the attachment portion 56 towards the distal end region 68, although in other implementations the first and second side edges 70, 72 may have other shapes, such as curved, arc-shaped, etc., and may have other angles/orientations (e.g., see the other implementations illustrated in FIGS. 6-11). The distal end region 68 terminates at a distal edge 74 generally extending transversely between the first and second side edges 70, 72. In the illustrated implementation, the distal edge 74 is substantially straight but may have a curvature or other shapes in other implementations (e.g., see the implementation illustrated in FIGS. 10-11). The illustrated distal edge 74 is also a relatively sharp blade, but may alternatively include cutting teeth. The longitudinal axis is disposed between the first and second side edges 70, 72 in a non-intersecting fashion. The body 58 includes a channel 76 open to one of the first or second side edges 70, 72 and extending towards the longitudinal axis L. Thus, the channel 76 has an open end 78 and a closed end 80. For example, in the illustrated implementation, the channel 76 is open to the second side edge 72, but may be open to the first side edge 70 in other implementations. The channel 76 may extend from the open end 78 towards the longitudinal axis L to the closed end 80 without intersecting the longitudinal axis L, with the longitudinal axis L being defined centrally along a length of the blade 42. In other implementations, the channel 76 may intersect the longitudinal axis L (e.g., see the implementation illustrated in FIGS. 9-10). In the illustrated implementation of FIGS. 3-5, the channel 76 extends into the body 58 a distance D1 (or a length of the channel) of about 0.75 inches (+/−0.1 inches) from the open end 78 to the closed end 80, but could extend a distance of between about 0.5 to about 1 inches in other implementations, and could extend larger or smaller distances in yet other implementations. The illustrated distance D1 is also less than 50% of a length of the distal edge 74. In some implementations, the distance D1 may be between about 20% and about 50% of the length of the distal edge 74. In other implementations, the distance D1 may be about 40% of the length of the distal edge 74. In further implementations, the distance D1 may be greater than 50% of the length of the distal edge 74 (e.g., see the implementation illustrated in FIG. 10), or the distance D1 may be less than 20% of the length of the distal edge 74 (e.g., see the implementation illustrated in FIG. 12). The channel 76 first converges from the open end 78 towards the longitudinal axis L, and then diverges proximate the closed end 80. The channel 76 is defined by a first elongated edge 82 and a second elongated edge 84 opposed to the first elongated edge 82. The first and second elongated edges 82, 84 extend between the open end 78 and the closed end 80 of the channel 76, transverse to the longitudinal axis L.

A largest distance D2 between the first and second elongated edges 82, 84 is smaller than the distance D1 of the channel from the open end 78 to the closed end 80. More specifically, the largest distance D2 between the first and second elongated edges 82, 84 is less than half the distance D1 of the channel from the open end 78 to the closed end 80.

The closed end 80 of the channel 76 may include a chamfered cutter 86 connecting the first elongated edge 82 to the second elongated edge 84. The chamfered cutter 86 is defined by a first cutting edge 88 and a second cutting edge 90 transverse to the first cutting edge 88, intersecting at an angle ⊖1 of between about 60 and about 120 degrees, and more specifically of between about 85 and about 105 degrees, and even more specifically of about 96 degrees (+/−2 degrees) in the illustrated implementation. The first and second cutting edges 88, 90 are toothless and at least partially chamfered to a sharp edge 89 (FIG. 5) for cutting the workpiece in a hammering fashion as the blade 42 oscillates. In the illustrated implementation, the first and second cutting edges 88, 90 are entirely chamfered to the sharp edge 89. In other implementations, the chamfered cutter 86 may have other shapes, curves, angles, etc. connecting the first and second elongated edges 82, 84.

The terms chamfer/chamfered are used interchangeably herein with the terms bevel/beveled. It should be understood that each chamfer or bevel includes an angled surface 81 extending between first and second generally parallel surfaces 83, 85 (FIG. 4), as can be seen in all the side views (FIGS. 4, 7, 9, 11, and 13). In the illustrated implementation, the angled surface 81 extends from the first generally parallel surface 83 to the second generally parallel surface 85; however, in other implementations, the angled surface 81 may extend between the first and second generally parallel surfaces 83, 85 while intersecting only one of the first or second generally parallel surfaces 83, 85. The first and second generally parallel surfaces 83, 85 may include top and bottom surfaces, respectively, of the body 58.

The angled surface 81 (or chamfer) has an angle ⊖2 of about 30 degrees (+/−5 degrees), but may have other angles in other implementations that achieve a sharp cutting edge (e.g., the sharp edge 89) suitable for cutting the desired workpiece. For example, the angle ⊖2 may be 10 to 80 degrees, or 10 to 70 degrees, or 15 to 50 degrees, or 20 to 40 degrees. All of the chamfers described herein have the angle ⊖2, although in other implementations some of the chamfers may be different from others.

The first and second elongated edges 82, 84 are toothless and at least partially chamfered to the sharp edge 89. In the illustrated implementation, the first and second elongated edges 82, 84 are toothless and entirely chamfered to the sharp edge 89. In some implementations, at least one of the first or second elongated edges 82, 84 is curved convexly into the channel 76, and in the illustrated implementation of FIGS. 3-5, both of the first and second elongated edges 82, 84 are curved convexly into the channel 76. More specifically, the first elongated edge 82 has a radius of curvature R1 of about 0.598 inches (+/−0.1 inches). The second elongated edge 84 has a radius of curvature R2 of about 0.750 inches (+/−0.1 inches). A gap 92 is defined between the first and second elongated edges 82, 84 at the smallest distance therebetween. The gap 92 corresponds with a thickness of the workpiece to be cut. For example, if the blade 42 is configured to cut ductwork (e.g., sheet metal), then the gap 92 can have a distance G (FIG. 5) between the first and second elongated edges 82, 84, with the distance G corresponding to the gauge of metal to be cut. For example, 16 gauge metal has a thickness of 0.0625 inches, so the distance G may be about 0.0625 inches (e.g., +/−0.01 inches). Furthermore, 24 gauge metal has a thickness of 0.025 inches, so the distance G may be about 0.025 inches (e.g., +/−0.01 inches). Furthermore, 26 gauge metal has a thickness of 0.01875 inches, so the distance G may be about 0.01875 inches (e.g., +/−0.01 inches). Furthermore, 30 gauge metal has a thickness of 0.0125 inches, so the distance G may be about 0.0125 inches (e.g., +/−0.01 inches). The distance G may be any value corresponding to the desired workpiece to be cut. "Corresponding to" encompasses values that are the same thickness as the workpiece to be cut and values that are approximately the same thickness as the workpiece to be cut (e.g., +/−0.01 inches or other appropriate tolerances for the material thickness), as well as values that are slightly larger than the thickness of the workpiece to be cut but still configured to cut the workpiece of predetermined thickness by oscillation of the blade 42 within an angular oscillation range defined by the power tool 10. For example, in some implementations, the gap 92 may be less than or equal to about 0.125 inches (+/−0.01 inches). In other implementations, the gap 92 may be less than or equal to about 0.083 inches (+/−0.01 inches). In other implementations, the gap 92 may be less than or equal to about 0.0625 inches (+/−0.01 inches). In yet other implementations, the gap 92 may be less than or equal to about 0.025 inches (+/−0.01 inches). In yet other implementations, the gap 92 may be less than or equal to about 0.0125 inches (+/−0.01 inches). The radii of curvature R1, R2 may have other values in other implementations in order to achieve the desired distance G for the desired workpiece to be cut.

In the illustrated implementation, the distal edge 74 is chamfered to the sharp edge 89 (FIGS. 4-5) and meets the second side edge 72 at a pointed tip portion 94 (FIGS. 3 and 5) configured to pierce a pilot hole in the workpiece (e.g., a hole in a surface of the workpiece material that is not started at an edge of the workpiece material). The distal edge 74 is transverse to the longitudinal axis L. In the illustrated implementation, the distal edge 74 is non-perpendicular to the longitudinal axis L, although in other implementations the distal edge 74 may be perpendicular to the longitudinal axis L. More specifically, the distal edge 74 is angled with respect to the longitudinal axis L at an angle ⊖3 of about 78 degrees (+/−1 degree), but may be between about 70 to 80 degrees in other implementations, and may have other angles in yet other implementations. A portion 96 of the second side edge 72 directly adjacent the pointed tip portion 94 is also chamfered to the sharp edge 89 such that the pointed tip portion 94 is defined at the intersection of two chamfered edges (e.g., the portion 96 of the second side edge 72 and the distal edge 74). The portion 96 is stepped (offset) inwards, closer to the longitudinal axis L than the rest of the second side edge 72. An angle ⊖4 of the pointed tip 94 is defined by the intersection of the second side edge 72 and the distal edge 74. In the illustrated implementation, the angle ⊖4 is less than 90 degrees (e.g., between about 70 and about 89 degrees, +/−1 degree). In other implementations, the distal edge 74 may meet the first side edge 70, rather than the second side edge 72, in the same fashion as described with respect to the second side edge 72. A distance D2 from the anchor center C to the pointed tip portion 94 is about 2.5 inches (+/−0.5 inches), but may be longer or shorter in other implementations. In other implementations, the blade 42 may have other dimensions, other sizes, other shapes, etc. In other implementations, the pointed tip portion 94 is optional and need not be included.

Figure 7:
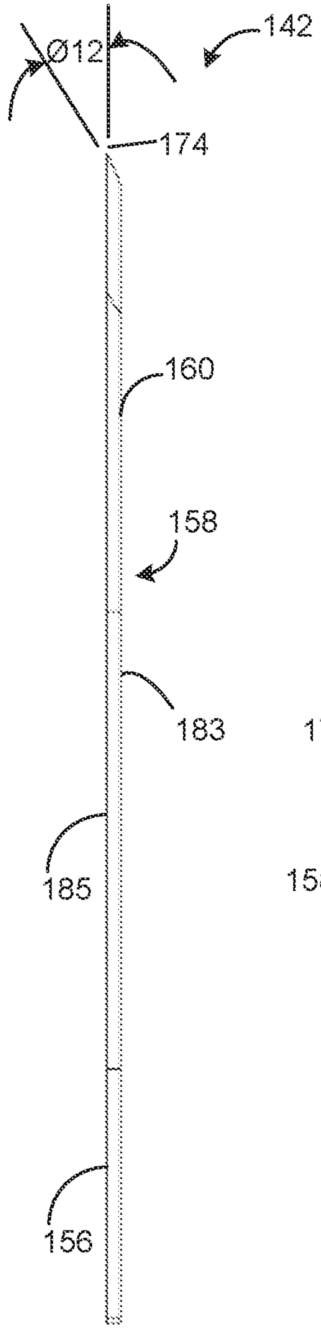
FIG. 7 is a side view of the blade shown in FIG. 6.
Figure 6:
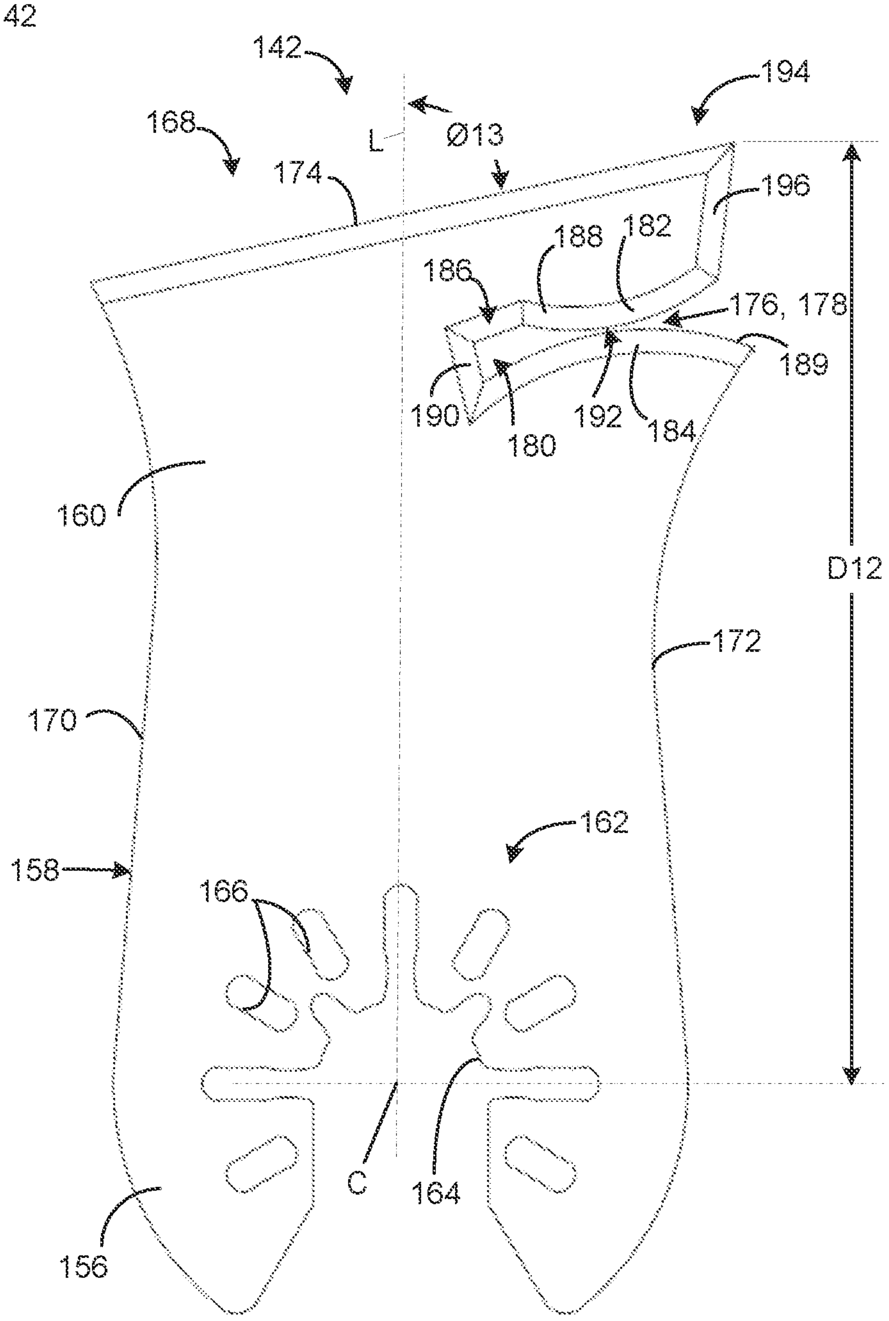
FIG. 6 is a top view of a blade attachable to the oscillating power tool of FIG. 1 according to another implementation of the disclosure.

FIGS. 6-7 illustrate a blade 142 according to another implementation of the disclosure. The blade 142 has the same material(s), features, and variations of the blade 42 described above except where differences are specifically described below. As such, description of the blade 42 above applies to the blade 142 where differences are not noted below and, rather than duplicate description, reference is made to the description above. Like reference numerals plus "100" are employed with respect to FIGS. 6-7 and should be understood to be supported by description of the like reference numerals described above, unless specifically described otherwise below.

The blade 142 is generally planar (see side view of FIG. 7) such that the attachment portion 156 and the body 158 generally extend in a single plane, though slight deviations from a plane may exist. The first and second side edges 170, 172 are concavely curved from the attachment portion 156 towards the distal end region 168, although the first and second side edges 170, 172 may have other curvatures and shapes in other implementations.

Figure 9:
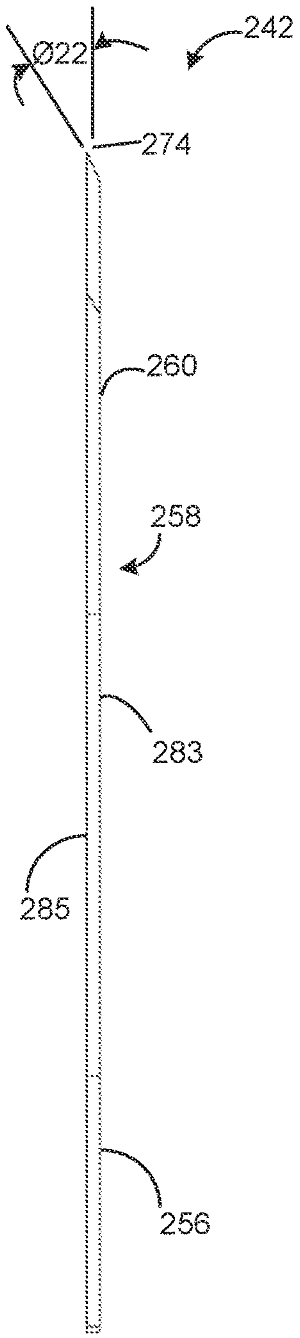
FIG. 9 is a side view of the blade shown in FIG. 8.
Figure 8:
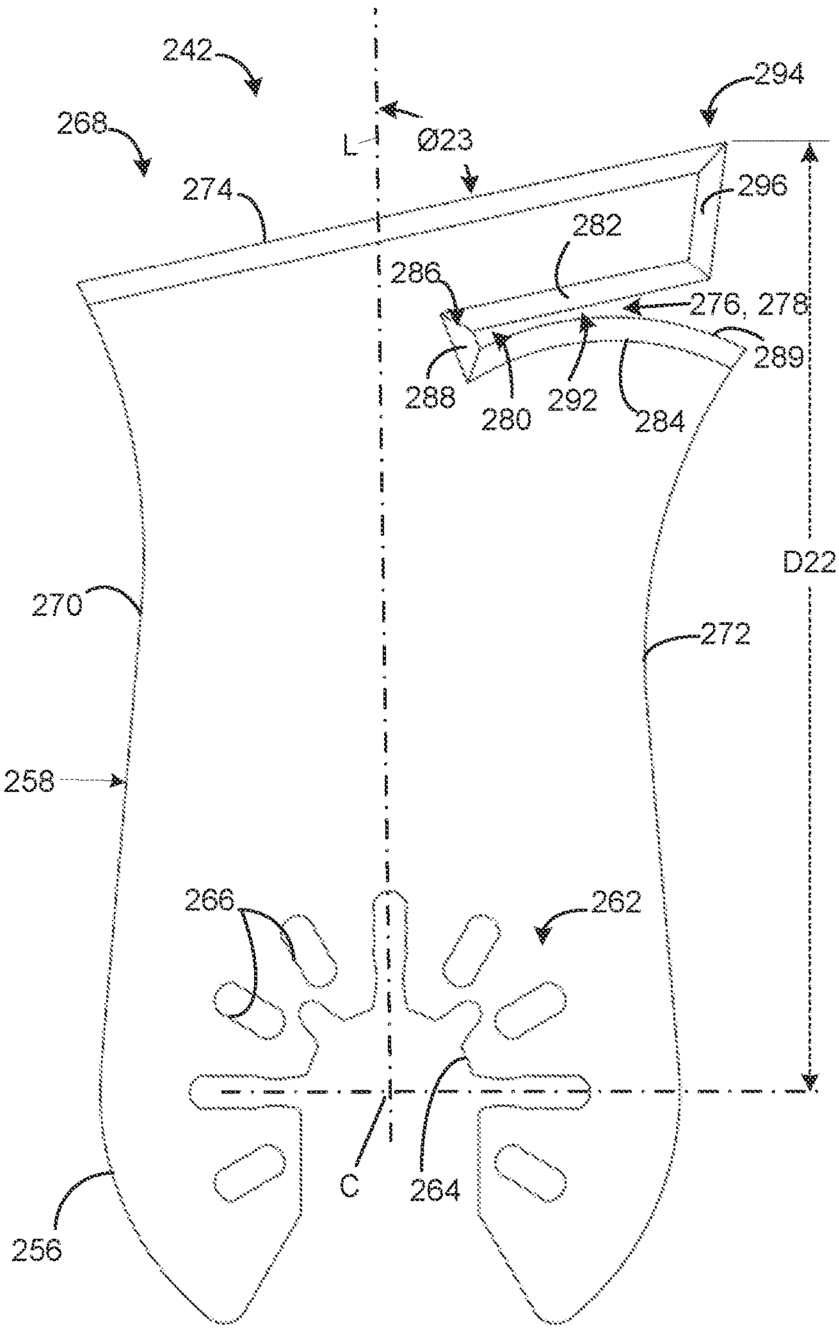
FIG. 8 is a top view of a blade attachable to the oscillating power tool of FIG. 1 according to another implementation of the disclosure.

FIGS. 8-9 illustrate a blade 242 according to another implementation of the disclosure. The blade 242 has the same material(s), features, and variations of the blade 42 described above except where differences are specifically described below. As such, description of the blade 42 above applies to the blade 242 where differences are not noted below and, rather than duplicate description, reference is made to the description above. Like reference numerals plus "200" are employed with respect to FIGS. 8-9 and should be understood to be supported by description of the like reference numerals described above, unless specifically described otherwise below.

The blade 242 is generally planar (see side view of FIG. 9) such that the attachment portion 256 and the body 258 generally extend in a single plane, though slight deviations from a plane may exist. The first and second side edges 270, 272 are concavely curved from the attachment portion 256 towards the distal end region 268, although the first and second side edges 270, 272 may have other curvatures and shapes in other implementations.

The channel 276 is defined by a first elongated edge 282 and a second elongated edge 284 opposed to the first elongated edge 282. The first and second elongated edges 282, 284 extend between the open end 278 and the closed end 280 of the channel 276, transverse to the longitudinal axis L. The closed end 280 of the channel 276 may include a chamfered cutter 286 connecting the first elongated edge 282 to the second elongated edge 284. The chamfered cutter 286 is defined by a cutting edge 288 extending from the first elongated edge 282 to the second elongated edge 284. The cutting edge 288 is toothless and chamfered to a sharp edge 289 for cutting the workpiece in a hammering fashion as the blade 242 oscillates.

The first and second elongated edges 282, 284 are toothless and chamfered to the sharp edge 289. In the illustrated implementation, the first elongated edge 282 is substantially straight, and the second elongated edge 284 is curved convexly into the channel 276 towards the first elongated edge 282.

Figure 11:
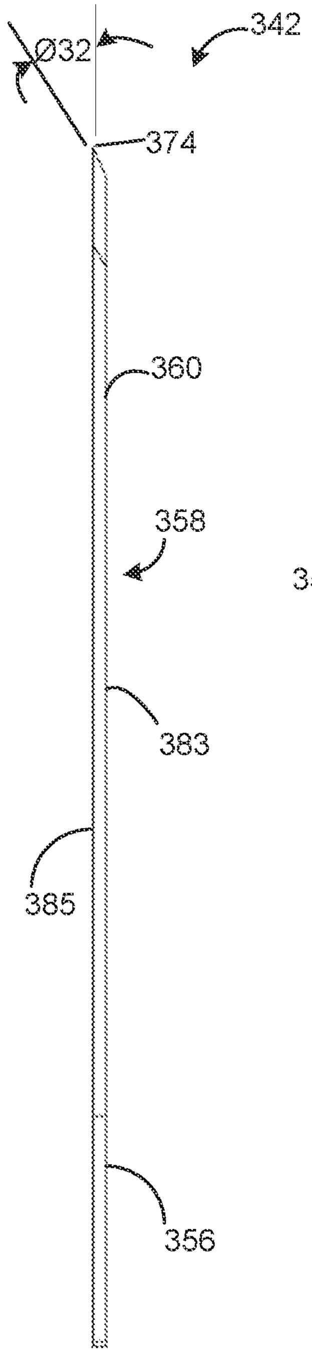
FIG. 11 is a side view of the blade shown in FIG. 10.
Figure 10:
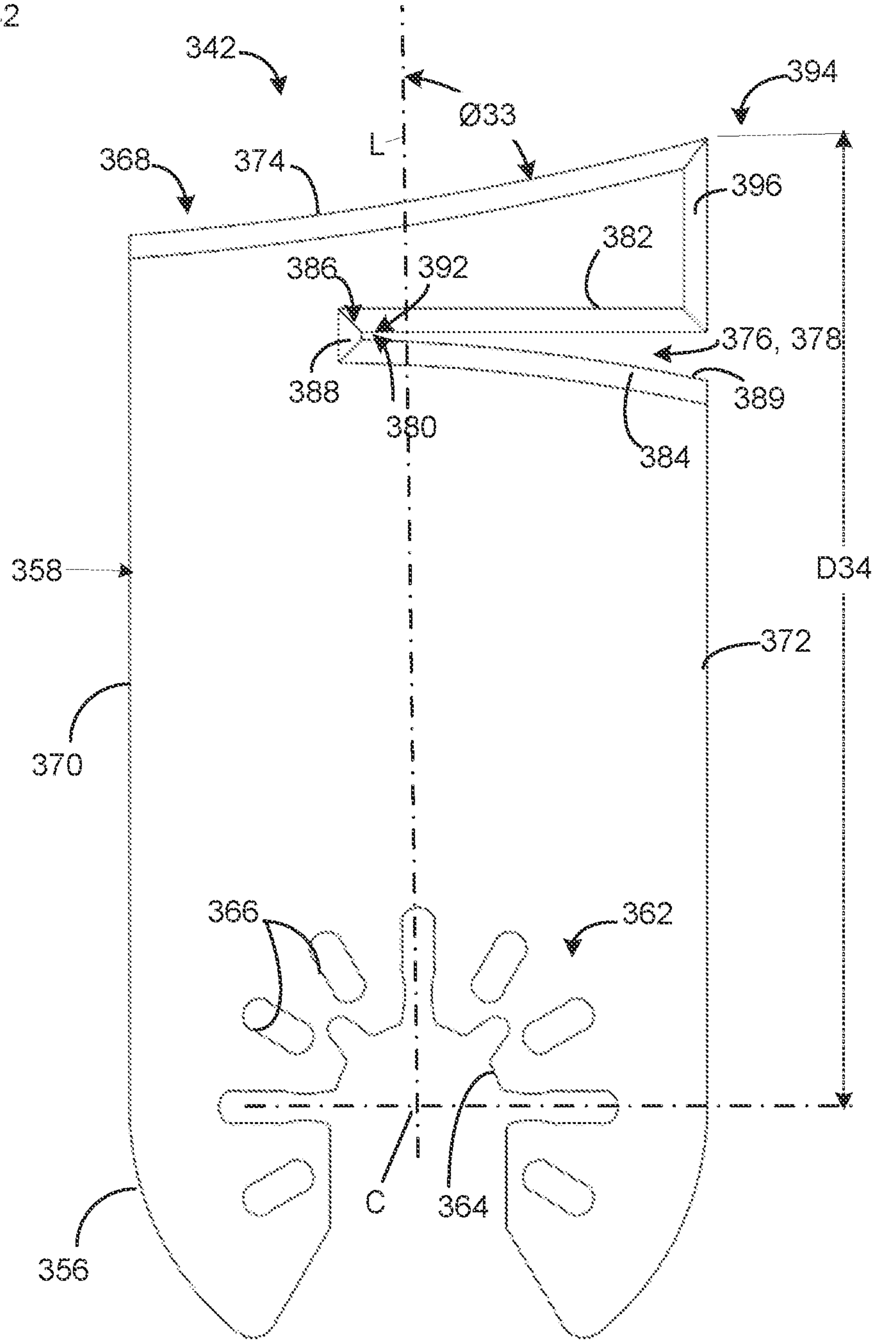
FIG. 10 is a top view of a blade attachable to the oscillating power tool of FIG. 1 according to another implementation of the disclosure.

FIGS. 10-11 illustrate a blade 342 according to another implementation of the disclosure. The blade 342 has the same material(s), features, and variations of the blade 42 described above except where differences are specifically described below. As such, description of the blade 42 above applies to the blade 342 where differences are not noted below and, rather than duplicate description, reference is made to the description above. Like reference numerals plus "300" are employed with respect to FIGS. 10-11 and should be understood to be supported by description of the like reference numerals described above, unless specifically described otherwise below.

The blade 342 is generally planar (see side view of FIG. 11) such that the attachment portion 356 and the body 358 generally extend in a single plane, though slight deviations from a plane may exist. The first and second side edges 370, 372 are substantially straight and parallel to each other as they extend from the attachment portion 356 towards the distal end region 368, although the first and second side edges 370, 372 may have some curvature and other shapes and orientations in other implementations.

The channel 376 is defined by a first elongated edge 382 and a second elongated edge 384 opposed to the first elongated edge 382. The first and second elongated edges 382, 384 extend between the open end 378 and the closed end 380 of the channel 376, transverse to the longitudinal axis L. The closed end 380 of the channel 376 may include a chamfered cutter 386 connecting the first elongated edge 382 to the second elongated edge 384. The chamfered cutter 386 is defined by a cutting edge 388 extending from the first elongated edge 382 to the second elongated edge 384. The cutting edge 388 is toothless and chamfered to a sharp edge 389 for cutting the workpiece in a hammering fashion as the blade 342 oscillates.

The first and second elongated edges 382, 384 are toothless and chamfered to the sharp edge 389. In the illustrated implementation, the first elongated edge 382 is substantially straight, and the second elongated edge 384 is curved convexly into the channel 376. The channel 376 converges continuously from the open end 378 to the closed end 380.

In other implementations, the first and second elongated edges 382, 384 may be arranged transverse to each other and intersecting at a point in a V-shaped arrangement, forming a V-shaped notch defining the channel 76.

Figure 14:
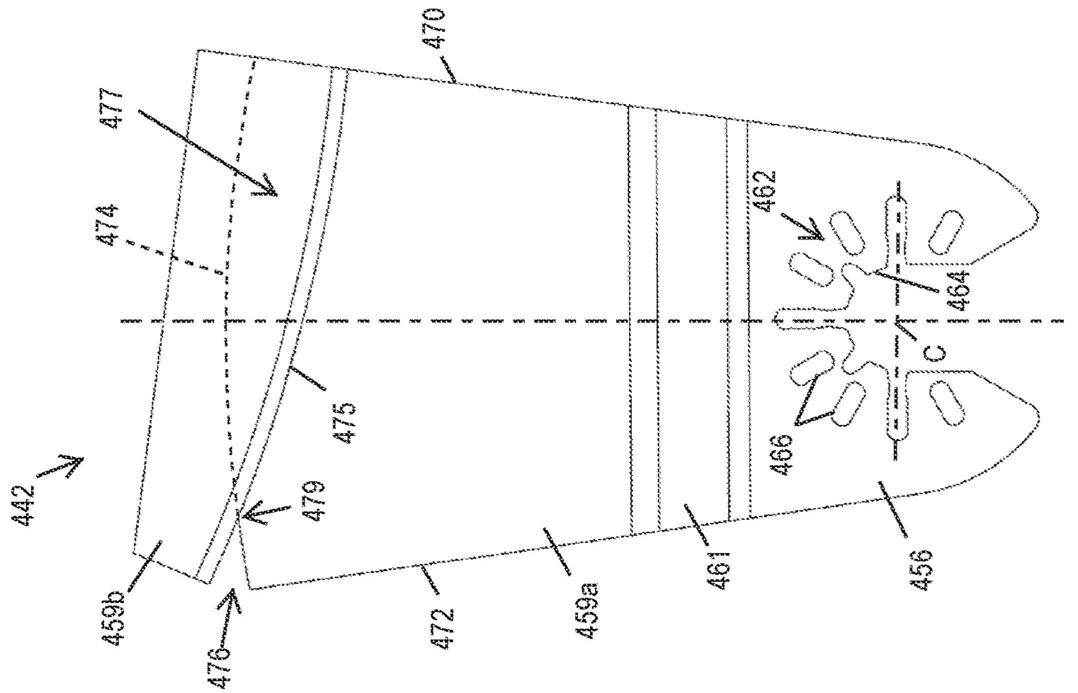
FIG. 14 is a bottom view of the blade shown in FIG. 12.
Figure 13:
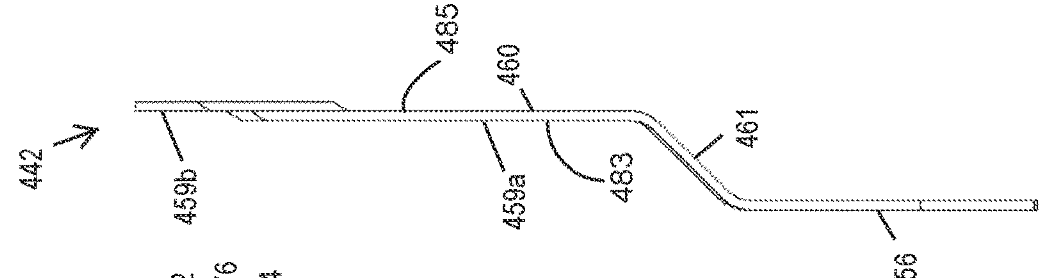
FIG. 13 is a side view of the blade shown in FIG. 12.
Figure 12:
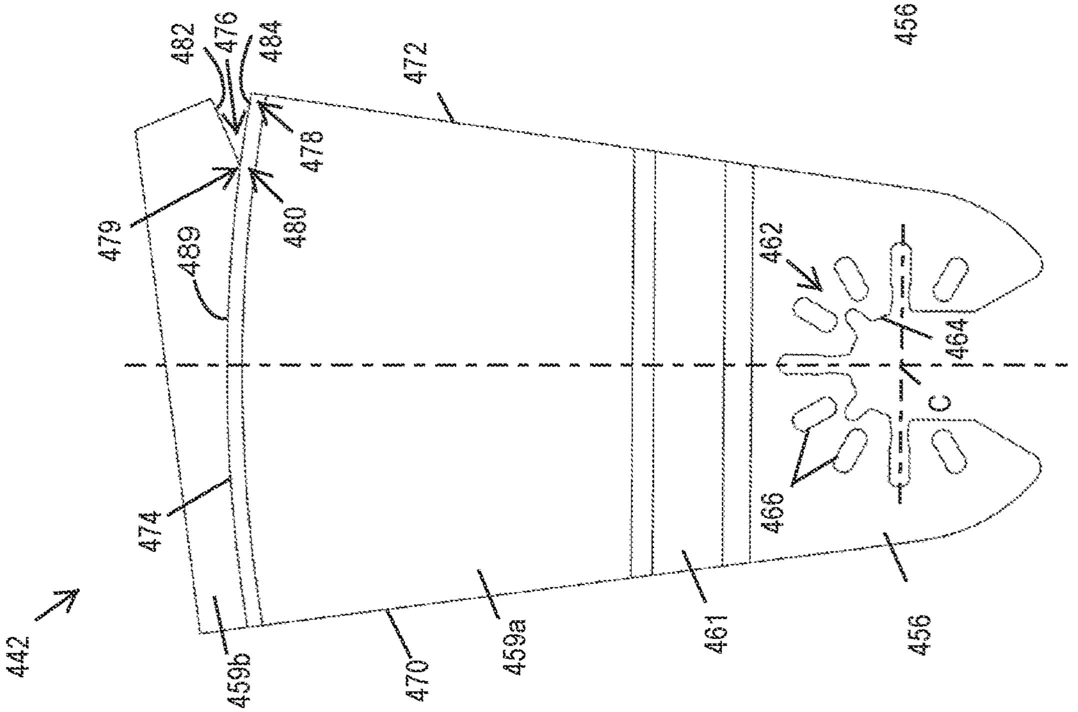
FIG. 12 is a top view of a blade attachable to the oscillating power tool of FIG. 1 according to another implementation of the disclosure.

FIGS. 12-14 illustrate a blade 442 according to another implementation of the disclosure. The blade 342 has the same material(s), features, and variations of the blade 42 described above except where differences are specifically described below. As such, description of the blade 42 above applies to the blade 442 where differences are not noted below and, rather than duplicate description, reference is made to the description above. Like reference numerals plus "400" are employed with respect to FIGS. 12-14 and should be understood to be supported by description of the like reference numerals described above, unless specifically described otherwise below.

The blade 442 has an attachment portion 456 as described above and a body 458. The body 458 is formed from a first body portion **459*a* and a second body portion 459*b*. The first and second body portions 459*a*, 459*b* are substantially planar. A distal edge 474 of the first body portion 459*a* is chamfered. In the illustrated implementation, the distal edge 474 is curved; however, in other implementations, the distal edge 474** may be straight or have any other suitable shape.

The second body portion 459*b* is attached to the first body portion 459*a* in an overlapping fashion along a planar junction 477 (FIG. 14), e.g., face to face. A portion of the second body portion 459*b* overhangs the first body portion 459*a*, forwardly of the distal edge 474 (i.e., farther from the attachment portion 456 than the distal edge 474). The first and second body portions 459*a*, 459*b* may be attached by welding, brazing, adhesive, rivets, fasteners, or any other suitable attachment means.

The second body portion 459*b* includes a proximal edge 475, disposed at a distal end of the second body portion 459*b* closest to the attachment portion 456. The proximal edge 475 is chamfered. The proximal edge 475 is chamfered on an opposite face of the blade 442 than the distal edge 474. In the illustrated implementation, the distal edge 474 is chamfered on a top (FIG. 12) of the blade 442 and the proximal edge 475 is chamfered on a bottom (FIG. 14) of the blade 442, opposite the top. Thus, the first and second body portion 459*a*, 459*b* are joined to form a scissor-like cutting channel with opposing chamfers. However, in other implementations, the distal edge 474 and the proximal edge 475 may be chamfered on the same side. In the illustrated implementation, the distal edge 474 is curved; however, in other implementations, the distal edge 474 may be straight or have any other suitable shape.

The distal edge 474 and the proximal edge 475 intersect at a vertex 479 disposed recessed from the second side edge 472 towards the longitudinal axis L. The distal edge 474 and the proximal edge 475 diverge from the vertex 479 to the second side edge 472 to define a channel 476 generally having a V-shape. The V-shape diverges from a closed end 480 (at the vertex 479) to an open end 478 (at the second side edge 472). The portion of the proximal edge 475 defining the channel 476 is a first elongated cutting edge 482, and the portion of the distal edge 474 defining the channel 476 is a second elongated cutting edge 484. In the illustrated implementation, the blade 442 does not include a pointed tip portion 494; however, in other implementations the blade 442 may include a pointed tip portion 494 as described above.

In operation, an operator attaches the blade 42 to the accessory holder 36 of the power tool 10. The operator grips the grip portion 22, actuates the power actuator 28 to oscillate the blade 42, and makes a cut in the workpiece (not shown). Specifically, the pointed tip portion 94 initiates the cut by piercing the workpiece (e.g., ductwork sheet metal) to create a pilot hole in a surface of the workpiece spaced from a side edge (not starting at the side edge). During this initial cutting of the pilot hole, adjacent portions of both the distal edge 74 and the portion 96 of the second side edge 72 engage the workpiece to form the initial cut as the blade 42 oscillates. The operator then plunges the blade 42 into the workpiece (e.g., through the ductwork sheet metal) and maneuvers the blade 42 such that primarily the portion 96 engages the workpiece, and then guides the workpiece into the channel 76. The operator then guides the blade 42 such that the workpiece extends into the channel 76 to the chamfered cutter 86 at the closed end 80. As the blade 42 oscillates, the first and second elongated edges 82, 84 primarily guide the workpiece to help stabilize the material being cut and may also score the workpiece material before it is cut by the chamfered cutter 86. The chamfered cutter 86 (e.g., the first cutting edge 88 and the second cutting edge 90 or any other arrangement of cutting edge or edges at the closed end 80) hammer into the workpiece material during oscillation and provide the majority of the cutting action. Thus, the workpiece cut is initiated by a plunging movement using the pointed tip portion 94 and continued with a lateral movement using the chamfered cutter 86, with the first and second elongated edges 82, 84 providing support and guidance for feeding the workpiece material into the chamfered cutter 86.

The blade 42 may also be used to initiate a cut from the side edge of the workpiece (e.g., a piece of sheet metal) rather than in the surface spaced from the side edges as described above. The operator may initiate a cut by inserting the side edge of the workpiece into the channel 76 either before or after the power tool power tool 10 is activated by way of the power actuator 28. The process proceeds to cut the workpiece as described above once the workpiece is in the channel 76. A non-plunge cutting method as such may be employed whether the blade 42 includes the pointed tip portion 94 or not.

The same or similar operation applies to the blades 142, 242, 342, and 442 shown in FIGS. 6-14 with respect to the like parts numbered with like numerals.

Thus, the disclosure provides, among other things, a blade for initiating a pilot hole in a workpiece, especially a sheet metal, and subsequently making a directional cut in the workpiece. Although the disclosure has been described in detail with reference to certain preferred implementations, variations and modifications exist within the scope and spirit of one or more independent aspects of the disclosure as described.

What is claimed is:

1. A blade for use with an oscillating power tool, the blade comprising:

an attachment portion including a mounting aperture arrangement configured to couple with the oscillating power tool;

a body extending from the attachment portion in a direction defining a longitudinal axis, the body including a distal end generally opposite the attachment portion and first and second side edges extending between the attachment portion and the distal end, the distal end including a cutting edge; and a channel open to one of the first or second side edges and extending towards the longitudinal axis from an open end to a closed end, the channel being defined by a first elongated edge and a second elongated edge opposed to the first elongated edge, wherein at least one of the first or second elongated edges includes a chamfer, wherein a largest distance between the first and second elongated edges is less than half a length of the channel from the open end to the closed end, and wherein both of the first and second elongated edges are convex and disposed in opposed relation such that the respective convex edges face toward one another to define a region of decreased thickness of the channel therebetween.

2. The blade of claim 1, wherein the at least one of the first or second elongated edges is chamfered to a sharp edge.

3. The blade of claim 1, wherein the first and second elongated edges both include the chamfer.

4. The blade of claim 1, wherein the first and second elongated edges are toothless.

5. The blade of claim 1, wherein the distal end meets one of the first or second side edges at a pointed tip portion configured to pierce a pilot hole in a workpiece.

6. The blade of claim 1, wherein the channel further comprises a gap between the first and second elongated edges defined as a smallest distance therebetween, wherein the gap is sized for cutting a sheet having a thickness of about 0.0625 inches or less between the first and second elongated cutting edges.

7. The blade of claim 1, wherein the longitudinal axis is disposed between the first and second side edges without intersecting the first and second side edges.

8. The blade of claim 1, wherein the first and second elongated edges extend from the open end toward the closed end.

9. The blade of claim 1, wherein the channel further includes a chamfered cutter extending from the first elongated edge to the second elongated edge proximate the closed end of the channel.

10. A blade for use with an oscillating power tool, the blade comprising:

an attachment portion including a mounting aperture arrangement configured to couple with the oscillating power tool;

a body extending from the attachment portion in a direction defining a longitudinal axis, the body including a distal end generally opposite the attachment portion and first and second side edges extending between the attachment portion and the distal end; and a channel open to the second side edge and extending towards the longitudinal axis from an open end to a closed end, the channel being defined by a first elongated edge extending towards the longitudinal axis from the second side edge and a second elongated edge opposed to the first elongated edge and extending towards the longitudinal axis from the second side edge, wherein at least one of the first or second edges is configured as a sharp cutting edge, wherein the closed end includes a linear cutting edge extending between and connecting the first elongated edge and the second elongated edge, wherein the distal end and the one of the first or second side edges meet at a pointed tip portion, and wherein both of the first and second elongated edges are convex and disposed in opposed relation such that the respective convex edges face toward one another to define a region of decreased thickness of the channel therebetween.

11. The blade of claim 10, wherein a largest distance between the first and second elongated edges is smaller than a length of the channel from the open end to the closed end.

12. A blade for use with an oscillating power tool, the blade comprising:

an attachment portion including a mounting aperture arrangement configured to couple with the oscillating power tool;

a body extending from the attachment portion in a direction defining a longitudinal axis, the body including a distal end generally opposite the attachment portion and first and second side edges extending between the attachment portion and the distal end; and a channel open to one of the first or second side edges and extending towards the longitudinal axis from an open end to a closed end, the channel being defined by a first elongated edge and a second elongated edge opposed to the first elongated edge, the channel including a gap between the first and second elongated edges defined as a smallest distance therebetween, wherein the gap is sized for cutting a sheet having a thickness of about 0.0625 inches or less between the first and second elongated cutting edges, wherein the gap is less than about 0.125 inches, wherein both of the first and second elongated edges are convex and disposed in opposed relation such that the respective convex edges face toward one another to define a region of decreased thickness of the channel therebetween.

13. The blade of claim 12, wherein the gap is less than or equal to about 0.0625 inches.

14. The blade of claim 12, wherein the gap is less than or equal to about 0.025 inches.

* * * * *